(12) United States Patent
Li

(10) Patent No.: US 8,810,634 B2
(45) Date of Patent: Aug. 19, 2014

(54) METHOD AND APPARATUS FOR GENERATING IMAGE WITH SHALLOW DEPTH OF FIELD

(75) Inventor: Yun-Chin Li, New Taipei (TW)

(73) Assignee: Altek Corporation, Hsinchu (TW)

( * ) Notice: Subject to any disclaimer, the term of this patent is extended or adjusted under 35 U.S.C. 154(b) by 524 days.

(21) Appl. No.: 13/193,608

(22) Filed: Jul. 29, 2011

(65) Prior Publication Data
US 2012/0092462 A1    Apr. 19, 2012

(30) Foreign Application Priority Data
Oct. 14, 2010   (TW) .............................. 99135063 A

(51) Int. Cl.
*H04N 13/02* (2006.01)
*G02B 27/22* (2006.01)
*H04N 13/00* (2006.01)

(52) U.S. Cl.
CPC ........ *G02B 27/2221* (2013.01); *H04N 13/0239* (2013.01); *H04N 2013/0081* (2013.01); *H04N 13/0018* (2013.01)
USPC ..................................... 348/49; 348/E13.074

(58) Field of Classification Search
CPC ........... G02B 27/2221; H04N 13/0018; H04N 13/0239; H04N 2013/0081
USPC ............................................ 348/49, E13.074
See application file for complete search history.

(56) References Cited

U.S. PATENT DOCUMENTS 6,064,424 A * 5/2000 van Berkel et al. ............. 348/51
6,157,733 A 12/2000 Swain
7,261,417 B2 * 8/2007 Cho et al. .......................... 353/10
7,418,150 B2 * 8/2008 Myoga ........................... 382/260
2008/0080852 A1 * 4/2008 Chen et al. ..................... 396/324
2008/0198920 A1 * 8/2008 Yang et al. ................ 375/240.01

(Continued)

FOREIGN PATENT DOCUMENTS

EP    2197217    6/2010
TW    475156     2/2002

(Continued)

OTHER PUBLICATIONS

"Office Action of Taiwan Counterpart Application", issued on Jun. 21, 2013, p. 1-p. 8.

(Continued)

*Primary Examiner* — Christopher S Kelley
*Assistant Examiner* — Asmamaw G Tarko
(74) *Attorney, Agent, or Firm* — Jianq Chyun IP Office

(57) ABSTRACT

A method and an apparatus for generating an image with shallow depth of field, suitable for a three-dimensional imaging system having a left lens and a right lens, are provided. First, the left lens and the right lens are used to capture a left-eye image and a right-eye image. Next, a disparity between each of a plurality of corresponding pixels in the left and right-eye images is calculated. Then, the depth information of each pixel is estimated according to a focus of the left and right lens, a lens pitch between the left lens and the right lens, and the calculated disparity of each pixel. Finally, the pixels in the left-eye image and the right-eye image are blurred according to the focus of the left lens and the right lens and the estimated depth information of each pixel, so as to obtain the image with shallow depth of field.

8 Claims, 3 Drawing Sheets

(56) References Cited

U.S. PATENT DOCUMENTS

| | | | |
|---|---|---|---|
| 2008/0303894 A1* | 12/2008 | Ernst et al. | 348/43 |
| 2009/0116732 A1* | 5/2009 | Zhou et al. | 382/154 |
| 2011/0122287 A1* | 5/2011 | Kunishige et al. | 348/229.1 |
| 2011/0128282 A1* | 6/2011 | Wang et al. | 345/419 |
| 2011/0242279 A1* | 10/2011 | Redert et al. | 348/43 |
| 2012/0133746 A1* | 5/2012 | Bigioi et al. | 348/50 |

FOREIGN PATENT DOCUMENTS

| | | |
|---|---|---|
| TW | 200529098 | 9/2005 |
| TW | 200816800 | 4/2008 |
| TW | 200843516 | 11/2008 |

OTHER PUBLICATIONS

Zhengzhen Liu and Tianding Chen, "Distance measurement System Based on Binocular Stereo Vision," International Joint Conference on Artificial Intelligence IEEE Computer Society, Apr. 25-26, 2009, pp. 1-4.

"Office Action of Taiwan Counterpart Application", issued on Feb. 10, 2014, p. 1-p. 8.

* cited by examiner

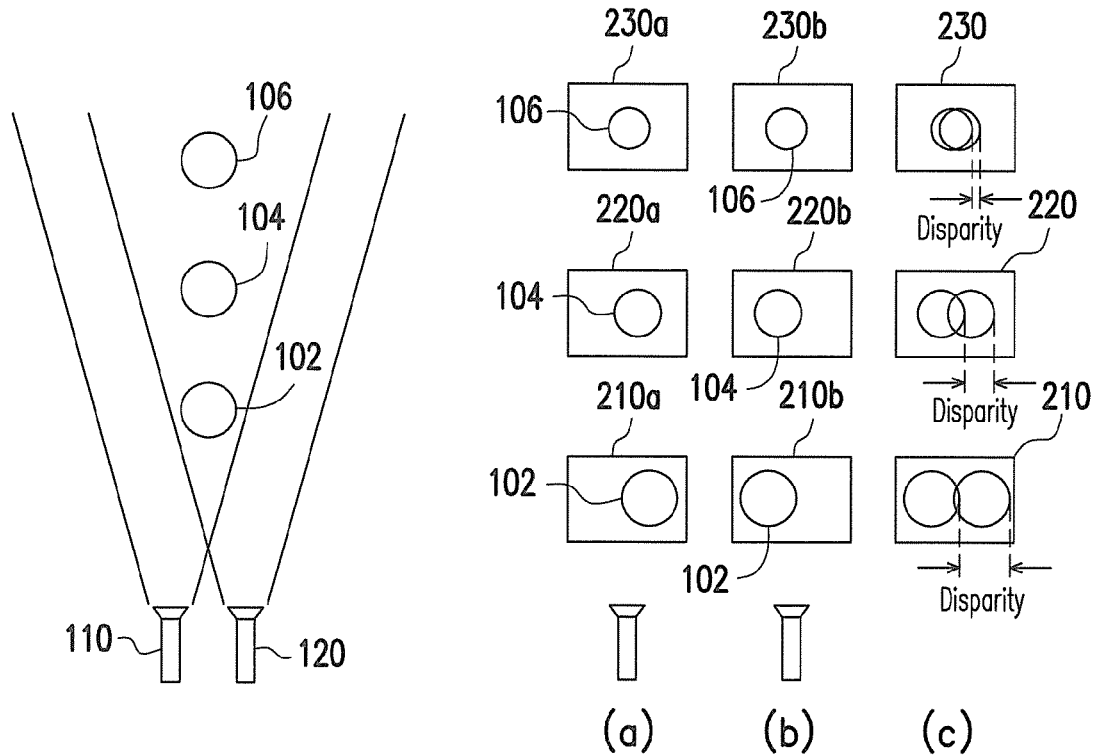
FIG. 1
FIG. 2
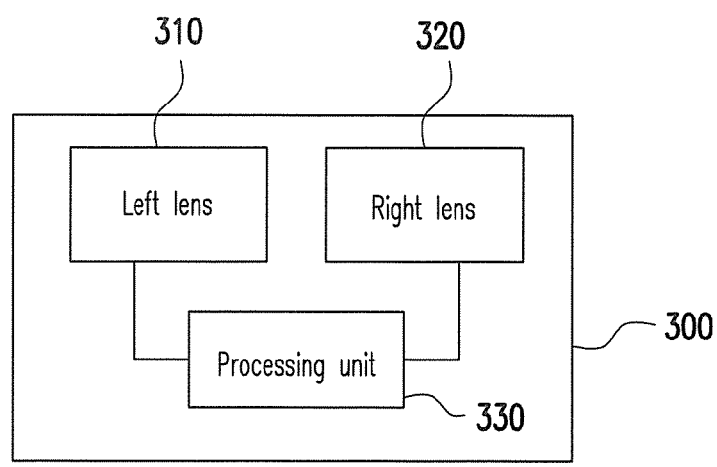
FIG. 3

METHOD AND APPARATUS FOR GENERATING IMAGE WITH SHALLOW DEPTH OF FIELD

CROSS-REFERENCE TO RELATED APPLICATION

This application claims the priority benefit of Taiwan application serial no. 99135063, filed Oct. 14, 2010. The entirety of the above-mentioned patent application is hereby incorporated by reference herein and made a part of this specification.

BACKGROUND OF THE INVENTION

1. Field of the Invention

This invention relates to an image processing method and apparatus thereof, and especially to a method and an apparatus for generating an image with shallow depth of field.

2. Description of Related Art

With the development of optical technology, cameras with adjustable diaphragms, shutters, and even replaceable lenses are gradually more and more popular. Cameras are also becoming multi-functioned. When using a camera, in order to highlight a theme of a captured image, a so-called shallow depth of field technique is used, wherein the camera lens is focused on a specific scope of a distance in the image, so the image of an object within the scope of the distance is clearly formed, and simultaneously, the images of the objects outside the scope of the distance are blurred.

However, the shallow depth of field effect in common camera lenses are limited. In order to obtain a better shallow depth of field effect, then lenses with large apertures must be used in order to enhance the blurring of long distance objects, and highlight the clearly formed theme from the background. Furthermore, lenses with large apertures have a bulky body and pricey cost, and is not equipped by common consumption cameras.

Another method of creating a shallow depth of field effect is through the image post-processing. The image processing method is used to estimate the depth relationship, and then accordingly enhance a blur level of long distance objects, so as to highlight the theme. However, this method can only rely on general perception to determine the blur level of an object. Regarding objects outside a focal range, the blur level is then hard to estimate, and may cause inaccuracies. As a result, after processing the image, the image may be discontinuous or unnatural.

Thus, how to obtain the correct depth information of an object in an image, so as to assist in differentiating the blur level of each object, and produce a better shallow depth of field effect, is a main challenge those in the field want to overcome.

SUMMARY OF THE INVENTION

The invention provides a method and an apparatus for generating an image with shallow depth of field, and can improve the authenticity of virtual shallow depth of field images.

The invention provides a method for generating an image with shallow depth of field, suitable for a three-dimensional imaging system having a left lens and a right lens. The left lens and the right lens are respectively used to capture a left-eye image and a right-eye image. Next, a disparity between each of a plurality of corresponding pixels in the left-eye image and the right-eye image is calculated. Then, the depth information of each pixel is estimated according to a focus that the left lens and the right lens adopts for capturing the left-eye image and the right-eye image, a lens pitch between the left lens and the right lens, and the calculated disparity of each pixel. Finally, the pixels in the left-eye image and the right-eye image are blurred according to the focus of the left lens and the right lens and the estimated depth information of each pixel, so as to obtain the image with shallow depth of field.

In an embodiment of the invention, the step of calculating the disparity between each of the plurality of corresponding pixels in the left-eye image and the right-eye image includes calculating a displacement between each pixel in the left-eye image and the right-eye image according to a position of each pixel in the left-eye image and the right-eye image, wherein the displacement is regarded as the disparity.

In an embodiment of the invention, the step of blurring the pixels of the left-eye image or the right-eye image according to the focus of the left lens and the right lens and the estimated depth information of the pixels, so as to obtain the image with shallow depth of field includes utilizing the focus of the left lens and the right lens to obtain a focal plane, calculating a distance between the pixel and the focal plane according to the depth information of each pixel, and then blurring the pixel according to the distance between each pixel and the focal plane, to obtain the image with shallow depth of field. A level of the blurred pixel is proportional to the calculated distance between the pixel and the focal plane.

In an embodiment of the invention, after the step of estimating the depth information of each pixel, the depth information of the pixels is compared, so as to identify at least one object in the left-eye image and the right-eye image, wherein each object includes a plurality of adjacent pixels with similar depth information. A difference value of the depth information of the adjacent pixels of each object is less than a preset value.

In an embodiment of the invention, the step of blurring the pixels of the left-eye image or the right-eye image according to the focus the left lens and the right lens adopts for capturing the left-eye image and the right-eye image, and the estimated depth information of the pixels, so as to obtain the image with shallow depth of field further includes calculating a blur level of each object, and immensely blurring the object of the left-eye image or the right-eye image according the blur level of the object, so as to obtain an image with shallow depth of field. A level of the immensely blurred object is proportional to the calculated blur level of the object.

The invention provides an apparatus for generating an image with shallow depth of field, comprising a left lens, a right lens, and a processing unit. The left lens is used to capture a left-eye image, and the right lens is used to capture a right-eye image, wherein there is a lens pitch between the left lens and the right lens. The processing unit is coupled to the left lens and the right lens, and is used to calculate a disparity between each of a plurality of corresponding pixels in the left-eye image and the right-eye image. It is also used to estimate a depth information of each pixel according to a focus that the left lens and the right lens adopts for capturing the left-eye image and the right-eye image, a lens pitch between the left lens and the right lens, and the disparity of each pixel, and to blur the pixels in the left-eye image or the right-eye image according to the focus of the left lens and the right lens and the depth information of each pixel, so as to obtain an image with shallow depth of field.

In an embodiment of the invention, the processing unit additionally compares the depth information of the pixels to identify at least one object in the left-eye image and the right-eye image, calculates a blur level of each object, and accordingly immensely blurs the objects in the left-eye image or the right-eye image, so as to obtain the image with shallow depth of field, wherein each identified object includes a plurality of adjacent pixels with similar depth information.

Based on the above, the method and apparatus of the invention for generating an image with shallow depth of field uses the disparity between the left-eye image and the right-eye image collected by the three-dimensional imaging system to estimate the depth information of each pixel. Then, the blurring process is performed on each pixel or object in the image according to the depth information, so as to generate a better virtual shallow depth of field image.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 1 is an example illustrating an image capture scope of a three-dimensional imaging system according to an embodiment of the invention.

FIG. 2(a)~(c) is an example illustrating an image capture scope of a three-dimensional imaging system according to an embodiment of the invention.

FIG. 3 is a block diagram of an apparatus for generating an image with shallow depth of field according to an embodiment of the invention.

DESCRIPTION OF EMBODIMENTS

Figure 4:
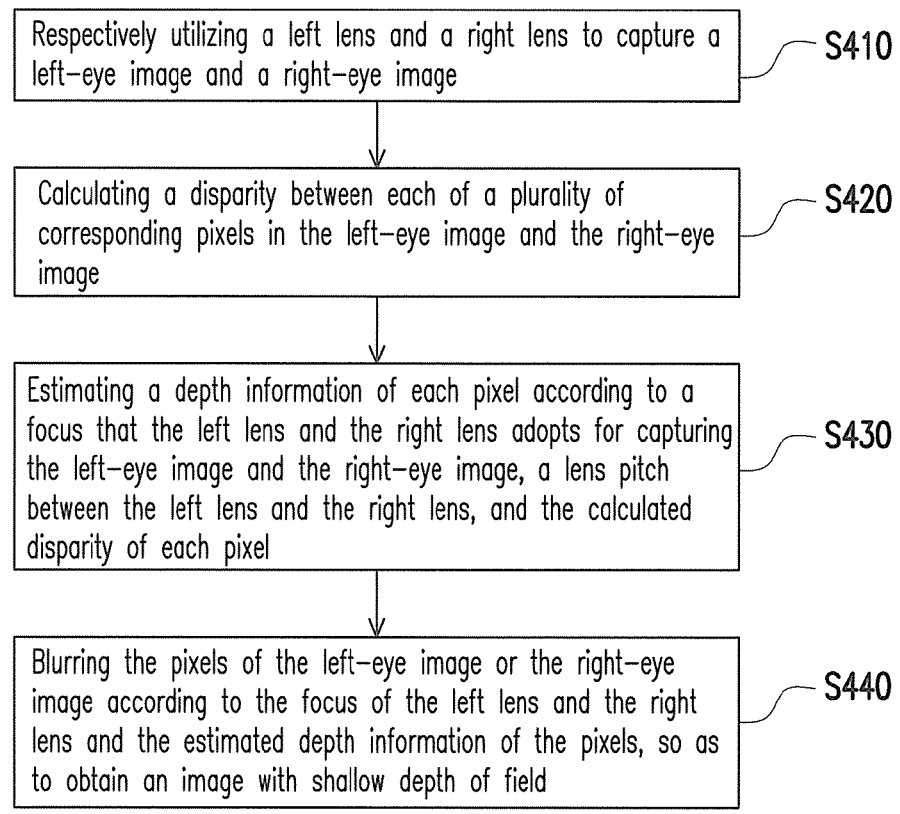
FIG. 4 is a flowchart of a method for generating an image with shallow depth of field according to an embodiment of the invention.

The double-lens of a three-dimensional imaging system can capture an image in the same area at different angles. Through combining the information of a disparity between images captured by the left and right lenses and the known information such as the lens pitch and focus, the depth information of each pixel or object in the image can be precisely estimated. The invention uses the three-dimensional imaging system to estimate the depth information of objects in an image, and accordingly blurs each object in the image, so as to generate an image with a better shallow depth of field effect.

In detail, FIG. 1 and FIG. 2(a)~(c) are examples illustrating an image capture scope of a three-dimensional imaging system according to an embodiment of the invention. Referring to both FIG. 1 and FIG. 2(a)~(c), the three-dimensional imaging system of the embodiment includes a left lens 110 and a right lens 120 with a fixed field of vision (as shown in FIG. 1). Then in the embodiment, in the field of vision of the left lens 110 and the right lens 120, objects (i.e. object 102, 104, and 106) of similar measurements are respectively placed in the front of the three-dimensional imaging system at positions of different distances. Regarding the objects 102, 104, and 106, the left lens 110 and the right lens 120 are respectively used to capture the obtained images 210a~230a in FIG. 2(a) and the images 210b~230b in FIG. 2(b). By stacking the images of similar objects, the images 210~230 as shown in FIG. 2(c) are obtained. In the images 210~230, the displacement between the stacked objects is regarded as the disparity. Seen from FIG. 2(c), objects with a further distance (e.g. object 106) have a smaller disparity in the images captured by the two lenses. On the other hand, objects with a closer distance (e.g. object 102) have a larger disparity in the images captured by the two lenses. The depth information of each object or pixel in the image can be estimated according to the disparity between the images captured by the left lens 110 and the right lens 120, as well as the lens pitch and focus of the left lens 110 and the right lens 120.

The invention is based on the above principle, and provides a method and an apparatus for generating an image with shallow depth of field. FIG. 3 is a block diagram of an apparatus for generating an image with shallow depth of field according to an embodiment of the invention. Referring to FIG. 3, an apparatus 300 of the embodiment is, for example, a three-dimensional imaging system that comprises a left lens 310, a right lens 320, and a processing unit 330.

A photosensitive device (not shown) is uniformly disposed in the left lens 310 and the right lens 320, used to respectively sense the intensity of the light entering the left lens 310 and the right lens 320, and then a left-eye image and a right-eye image are generated. The photosensitive device is, for example, a charge coupled device (CCD), a complementary metal-oxide-semiconductor (CMOS) device or other devices, the device is not limited thereto. In addition, there is, for example, a lens pitch of 77 millimeter between the left lens 310 and the right lens 320, which can imitate the distance between human eyes.

The processing unit 330 is, for example, a central processing unit (CPU), a microprocessor, a digital signal processor (DSP), a programmable controller, application specific integrated circuits (ASIC), a programmable logic device (PLD) or other similar devices. The processing unit 330 is coupled to the left lens 310 and the right lens 320, and is used to process the collected left-eye image and right-eye image from the left lens 310 and the right lens 320, so as to obtain an image with shallow depth of field.

In detail, FIG. 4 is a flowchart of a method for generating an image with shallow depth of field according to an embodiment of the invention. Referring to FIG. 3 and FIG. 4, the method of the embodiment is adapted to the apparatus 300 in FIG. 3, and is suitable to generate a shallow depth of field effect in the outputted image when the user uses the apparatus 300 to capture an image. The following describes the steps of the method of the embodiment with the various components of the apparatus 300 of FIG. 3.

First, the left lens 310 and the right lens 320 are respectively utilized to capture a left-eye image and a right-eye image (Step S410). The left lens 310 and the right lens 320, for example, adopt similar image capture parameters. The parameters include a focus, a diaphragm, a camera shutter, and a white balance, however, the embodiment is not limited thereto.

Next, a disparity between each of a plurality of corresponding pixels in the left-eye image and the right-eye image is calculated through the processing unit 330 (Step S420). In detail, in the embodiment, the disparity is calculated by pixel, and the calculating method is similar to the method as shown in FIG. 2(c). A displacement of the pixel in the image is calculated according to the positions of a pixel (for example the rightmost pixel of the object 106) corresponding to the left-eye image and the right-eye image, in the images (i.e. image 210a and 210b), and is regarded as the disparity of the pixel.

Then, a depth information of each pixel is estimated by the processing unit 330 according to a focus that the left lens 310 and the right lens 320 adopts for capturing the left-eye image and the right-eye image, a lens pitch between the left lens 310 and the right lens 320, and the calculated disparity of each pixel (Step S430). In detail, as seen from the example drawn in FIG. 1 and FIG. 2(a)~(c), the disparity between the left-eye image and the right-eye image and the corresponding pixels is determined through the lens focus (determines the size of the image), the lens pitch (determines the overlapping scope of the image), and the distance between the lenses and the object corresponding the pixel (i.e. depth information, determines the object size in the image). These parameters have a certain relationship, and a recorded table of the relationships may be obtained through tests before the apparatus 300 leaves its factory. Thus, when the user uses the apparatus 300 to capture images and calculates the disparity of the pixels in the image, the completed table of relationships may be used to search and obtain parameters.

Finally, the pixels in the left-eye image and the right-eye image are blurred by the processing unit 330 according to the focus of the left lens 310 and the right lens 320 and the estimated depth information of each pixel, so as to obtain the image with shallow depth of field (S440). In detail, the goal of the shallow depth of field effect is to maintain the distinctiveness of an object in a focal range, and to gradually blur the objects outside the focal range depending on the distance of the objects, in order to highlight the object within the focal range.

Figure 5:
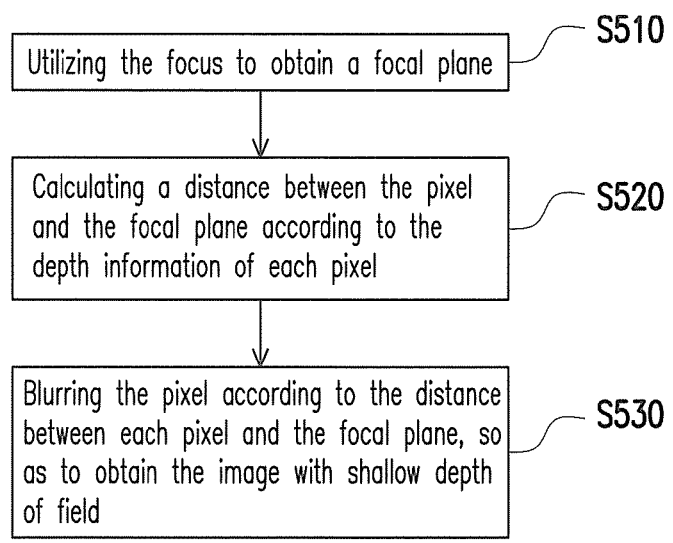
FIG. 5 is a flowchart of a method for blurring pixels in an image according to an embodiment of the invention.

For example, FIG. 5 is a flowchart of a method for blurring pixels in an image according to an embodiment of the invention. Referring to FIG. 5, a focal plane is obtained by the processing unit 330 in the embodiment by using the focus of the left lens 310 and the right lens 320 (Step S510). Then, a distance between the pixel and the focal plane is calculated according to the depth information obtained for each pixel (Step S520). Finally, the pixels can be blurred according to the distance between each pixel and the focal plane, so as to obtain an image with shallow depth of field (Step S530). A level of the blurred pixel is, for example, proportional to the calculated distance between the pixel and the focal plane, which means the closer the pixel is, the lighter the blurring is, and the farther the pixel is, the heavier the blurring is. In addition, the blurring process, for example, adopts a blur filter, which performs a weighted averaging on the pixel values of the target pixel and the surrounding pixels. The filter measurements and type of filter being used can be automatically selected through the processing unit 330 according to the previous capture mode or can be selected by the user according to the capture environment, but is not limited thereto.

Since the method for generating the image with shallow depth of field uses precise pixel depth information to carry out the blurring process, thus the generated image also has a better shallow depth of field effect, and substantially improves the authenticity of virtual shallow depth of field images.

It should be noted that besides the method of carrying out the blurring process on each pixel in an image, the invention also includes carrying out a blurring process directed towards each physical object in an image, similarly achieving the goal of the invention of improving a shallow depth of field effect. The following further describes another embodiment.

Figure 6:
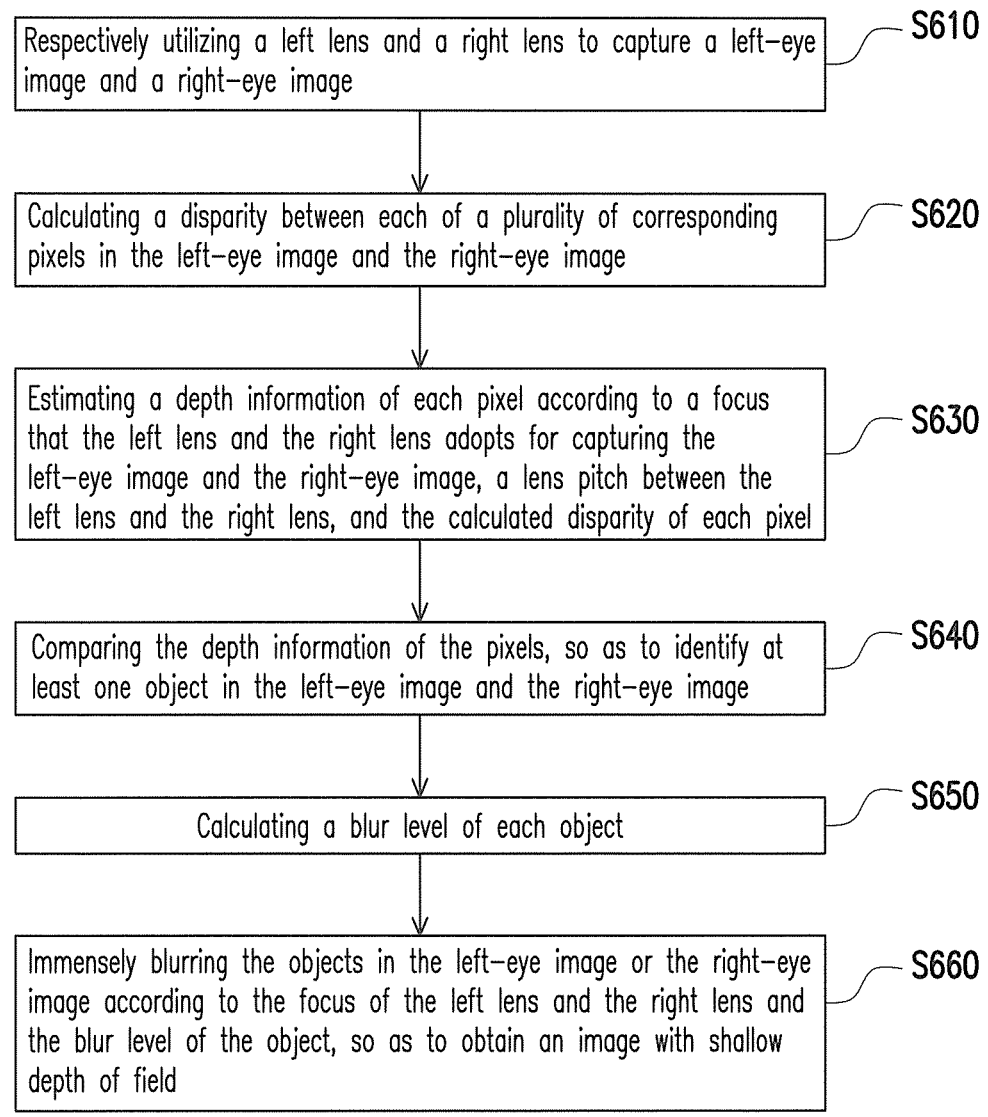
FIG. 6 is a flowchart of a method for generating an image with shallow depth of field according to an embodiment of the invention.

FIG. 6 is a flowchart of a method for generating an image with shallow depth of field according to an embodiment of the invention. Referring to FIG. 3 and FIG. 6, the method of the embodiment is adapted to the apparatus 300 in FIG. 3, and is suitable to generate a shallow depth of field effect in the outputted image when the user uses the apparatus 300 to capture an image. The following describes the steps of the method of the embodiment with the various components of the apparatus 300 of FIG. 3.

First, the left lens 310 and the right lens 320 are respectively used to capture a left-eye image and a right-eye image (Step S610). Next, a disparity between each of a plurality of corresponding pixels in the left-eye image and the right-eye image is calculated through the processing unit 330 (Step S620). Then, a depth information of each pixel is estimated according to a focus that the left lens 310 and the right lens 320 adopts for capturing the left-eye image and the right-eye image, a lens pitch between the left lens 310 and the right lens 320, and the calculated disparity of each pixel (Step S630). Steps S610-S630 are the same as or similar to steps S410-S430 in the previous embodiment, so the detailed contents are not repeated herein.

The difference between the previous embodiment and the present embodiment is that in the present embodiment, after the depth information of each pixel is estimated by the processing unit 330, the depth information of each pixel is compared, so as to identify at least one object in the left-eye image and the right-eye image (Step S640). Each object identified by the processing unit 330 uniformly includes a plurality of adjacent pixels with similar depth information, and the so-called similar depth information means a difference value of the depth information of the adjacent pixels of the object is less than a preset value, and image blocks with this characteristic can be reasonably considered as an independent object. In addition, in another embodiment of the invention, the processing unit 330 can simultaneously compare the pixel value of each pixel, so as to identify an object in the image. For example, the outline of connected pixel blocks can be used to identify an object, but the embodiment does not limit the method.

Next, the processing unit 330 calculates the blur level of each identified pixel (Step S650). The corresponding object of the left-eye image or the right-eye image is immensely blurred according to the focus of the left lens 310 and the right lens 320 and the calculated blur level of each object, so as to obtain an image with shallow depth of field (Step S660). The processing unit 330, for example, obtains a focal plane according to the focus of the left lens 310 and the right lens 320, and performs an immense blurring process on the objects located outside the focal plane according to the depth information of each object, so as to maintain distinctiveness of the object within the focal plane. A level of the immensely blurred object is proportional to the calculated blur level of the object, which means the less blurry an object is, the lighter the bluffing is performed, and the more blurry an object is, the heavier the blurring is performed. Thus, a better shallow depth of field effect is obtained.

Generally, in the method and apparatus of the invention for generating an image with shallow depth of field, the depth information of each pixel or object of an image is estimated by using the left and right eye images captured by the three-dimensional imaging system. Thus, a more precise estimation of the depth information is obtained, and the result is applied to the blurring of the image. Then, a better shallow depth of field effect is obtained, so as to substantially improve the authenticity of virtual shallow depth of field images.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for generating an image with shallow depth of field, suitable for a three-dimensional imaging system comprising a left lens and a right lens, the method comprises the following steps:
   respectively utilizing the left lens and the right lens to capture a left-eye image and a right-eye image;
   calculating a disparity between each of a plurality of corresponding pixels in the left-eye image and the right-eye image;
   estimating a depth information of each pixel according to a focus that the left lens and the right lens adopts for capturing the left-eye image and the right-eye image, a lens pitch between the left lens and the right lens, and the calculated disparity of each pixel; and
   blurring the pixels of the left-eye image or the right-eye image according to the focus of the left lens and the right lens and the estimated depth information of the pixels, so as to obtain an image with shallow depth of field,
   wherein the step of blurring the pixels of the left-eye image or the right-eye image according to the focus of the left lens and the right lens and the estimated depth information of the pixels to obtain the image with shallow depth of field comprises:
      utilizing the focus to obtain a focal plane;
      calculating a distance between the pixel and the focal plane according to the depth information of each pixel; and
      blurring the pixel according to the distance between each pixel and the focal plane, to obtain the image with shallow depth of field, wherein a level of the blurred pixel is proportional with the calculated distance between the pixel and the focal plane.

2. The method for generating an image with shallow depth of field as claimed in claim 1, wherein the step of calculating the disparity between each of the plurality of corresponding pixels in the left-eye image and the right-eye image comprises:
   calculating a displacement between each pixel in the left-eye image and the right-eye image according to a position of each pixel in the left-eye image and the right-eye image, wherein the displacement is regarded as the disparity.

3. The method for generating an image with shallow depth of field as claimed in claim 1, wherein after the step of estimating the depth information of each pixel, the method further comprises:
   comparing the depth information of the pixels, so as to identify at least one object in the left-eye image and the right-eye image, wherein each at least one object includes a plurality of adjacent pixels with similar depth information.

4. The method for generating an image with shallow depth of field as claimed in claim 3, wherein a difference value of the depth information of the adjacent pixels of each at least one object is less than a preset value.

5. The method for generating an image with shallow depth of field as claimed in claim 3, wherein the step of blurring the pixels of the left-eye image or the right-eye image according to the captured focus of the left lens and the right lens and the estimated depth information of the pixels, to obtain the image with shallow depth of field further comprises:
   calculating a blur value of each at least one object; and
   immensely blurring the object of the left-eye image or the right-eye image according to the captured focus of the left lens and the right lens and the blur value of the object, so as to obtain an image with shallow depth of field.

6. The method for generating an image with shallow depth of field as claimed in claim 5, wherein a level of the immensely blurred object is proportional with the calculated blur value of the object.

7. An apparatus for generating an image with shallow depth of field, comprising:
   a left lens, to capture a left-eye image;
   a right lens, to capture a right-eye image, wherein there is a lens pitch between the left lens and the right lens; and
   a processing unit, coupled to the left lens and the right lens, to calculate a disparity between each of a plurality of corresponding pixels in the left-eye image and the right-eye image, to estimate a depth information of each pixel according to a focus that the left lens and the right lens adopts for capturing the left-eye image and the right-eye image, a lens pitch between the left lens and the right lens, and the disparity of each pixel, and to blur the pixels in the left-eye image or the right-eye image according to the focus of the left lens and the right lens and the depth information of each pixel, so as to obtain an image with shallow depth of field, wherein the processing unit utilizes the focus to obtain a focal plane, calculates a distance between the pixel and the focal plane according to the depth information of each pixel, and blurs the pixel according to the distance between each pixel and the focal plane, to obtain the image with shallow depth of field, wherein a level of the blurred pixel is proportional with the calculated distance between the pixel and the focal plane.

8. The apparatus for generating an image with shallow depth of field as claimed in claim 7, wherein the processing unit additionally compares the depth information of the pixels, to identify at least one object in the left-eye image and the right-eye image, and calculates a blur level of each at least one object, and accordingly immensely blurs the object in the left-eye image or the right-eye image, so as to obtain the image with shallow depth of field, wherein the identified each at least one object includes a plurality of adjacent pixels with similar depth information.

* * * * *